United States Patent
Dings et al.

(10) Patent No.: US 7,937,369 B1
(45) Date of Patent: May 3, 2011

(54) DATA MOVER DISCOVERY OF OBJECT EXTENT

(75) Inventors: Thomas L. Dings, Hopkinton, MA (US); Jacob M. Jacob, Franklin, MA (US); Subramanian Periyagaram, Sunnyvale, CA (US); Pashupati Kumar, San Jose, CA (US); Robert W. Toop, Stow, MA (US)

(73) Assignee: EMC Corporation, Hopkinton, MA (US)

( * ) Notice: Subject to any disclaimer, the term of this patent is extended or adjusted under 35 U.S.C. 154(b) by 766 days.

(21) Appl. No.: 11/440,964

(22) Filed: May 25, 2006

Related U.S. Application Data

(60) Provisional application No. 60/723,086, filed on Sep. 30, 2005.

(51) Int. Cl.
 *G06F 7/00* (2006.01)
 *G06F 17/00* (2006.01)
 *G06F 13/00* (2006.01)
(52) U.S. Cl. ......... 707/652; 707/655; 711/162; 711/165
(58) Field of Classification Search .................. 707/202, 707/204, 652, 655; 711/162, 165
 See application file for complete search history.

(56) References Cited

U.S. PATENT DOCUMENTS

| | | | |
|---|---|---|---|
| 6,029,166 A | 2/2000 | Mutalik et al. | |
| 6,041,344 A * | 3/2000 | Bodamer et al. | 709/203 |
| 6,047,294 A | 4/2000 | Deshayes et al. | |
| 6,345,292 B1 * | 2/2002 | Daugherty et al. | 709/214 |
| 6,360,330 B1 * | 3/2002 | Mutalik et al. | 714/4 |
| 6,578,121 B1 * | 6/2003 | Schutzman | 711/162 |
| 6,760,823 B1 | 7/2004 | Schutzman | |
| 6,763,423 B2 * | 7/2004 | Stakutis et al. | 711/5 |
| 6,804,690 B1 | 10/2004 | Dysert et al. | |
| 6,934,725 B1 | 8/2005 | Dings | |
| 6,938,180 B1 | 8/2005 | Dysert et al. | |
| 7,099,900 B1 * | 8/2006 | Bromley et al. | 707/652 |
| 2002/0002661 A1 * | 1/2002 | Blumenau et al. | 711/165 |

* cited by examiner

*Primary Examiner* — Apu M Mofiz
*Assistant Examiner* — Chelcie Daye
(74) *Attorney, Agent, or Firm* — Van Pelt, Yi & James LLP

(57) ABSTRACT

Performing data backup for a client includes receiving, at a host other than the client, volume information including data indicating a physical data storage location of at least a part of a volume comprising one or more stored objects associated with the client; and determining at the host, based at least in part on the volume information, a stored object information for a stored object included in the volume, the stored object information including data associated with a physical data storage location of the stored object.

18 Claims, 8 Drawing Sheets

DATA MOVER DISCOVERY OF OBJECT EXTENT

CROSS REFERENCE TO OTHER APPLICATIONS

This application claims priority to U.S. Provisional Patent Application No. 60/723,086 entitled BACKUP filed Sep. 30, 2005 which is incorporated herein by reference for all purposes.

BACKGROUND OF THE INVENTION

Data backup systems are important for storing information and preventing data loss. In a typical data storage environment, as data is generated by a client device, it is stored in appropriate production data storage. During a backup operation, the data is copied from the production data storage to backup media, e.g., removable media, such as optical disks or magnetic tapes, or fixed storage such as a content addresses storage, disk array, dedicated storage server, etc.

Some existing backup systems employ a backup server to copy data from the production data storage to the backup media. During a backup operation, the client device typically performs a discovery operation to determine the appropriate physical location for a file on the production data storage. The location information and the length of the file are transmitted to the backup server, which uses the location and length information for each file to copy that file from the given location to the backup media. However, performing file extent discovery on the client takes time and consumes computing resources on the client and therefore can affect adversely the client's performance and/or availability, as well as extend the total time required to complete a backup of the client.

It would be useful, among other things, to be able to backup a client without affecting the performance and/or availability of the client as greatly as current approaches.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A data backup technique is described. In some embodiments, to perform data backup for a client, volume information of a volume comprising a plurality of stored objects is received by a host other than the client. The volume is associated with the client, and the volume information includes data indicating a physical data storage location of at least a part of the volume. Based at least in part on the volume information, the host determines stored object information for one or more stored objects included in the volume. The stored object information includes data indicating a location of the stored object within the volume. In some embodiments, the host copies the stored object from the physical data storage location to a backup data storage.

In some embodiments, the volume includes multiple stored objects, and greater efficiency is achieved by copying stored objects for which the stored object information has already been determined in parallel with continued processing of the volume information to determine stored object information for other stored objects included in the volume.

Figure 1:
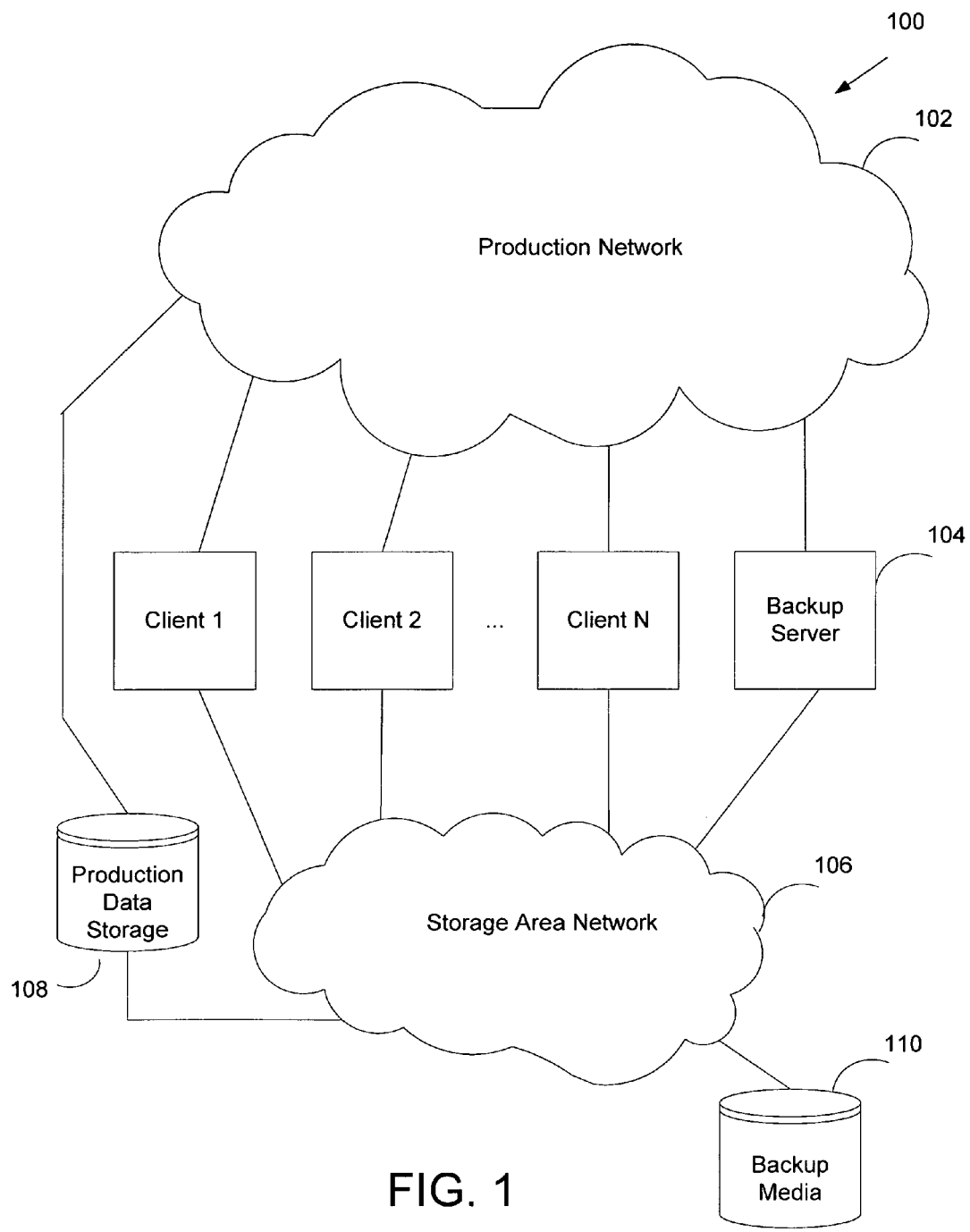
FIG. 1 is a system diagram illustrating an embodiment of an enterprise network environment that includes a data backup system.

FIG. 1 is a system diagram illustrating an embodiment of an enterprise network environment that includes a data backup system. In this example, the enterprise network 100 includes a number of client devices 1 to N. Examples of client devices include any electronic devices that produce data that requires backup. The data generated by a client is transferred from the client via a production network 102 to a production data storage 108, which in this example is shared by the clients 1 to N. In some embodiments, data is transferred between a client and production data storage 108 via storage area network 106 and/or via a direct connection, instead of via production network 102. The production data storage includes one or more storage disks or other appropriate storage media. Data generated by the client devices is stored on the production data storage prior to the backup operation. The data comprises one or more stored objects, such as file objects, database objects, etc. The production network may be a local area network that supports Internet Protocol (IP) or other appropriate protocol.

In this example, a backup server or other storage node 104 coordinates the backup operations. A process referred to as the data mover executes on backup server 104 and copies data from production data storage 108 via a storage area network 106 to backup media 110. In some embodiments, only certain objects, such as files, directories or database entries that have been added or modified since the last backup, are copied from the production data storage to the backup media. The client cooperates with the data mover to locate the items to be copied. Details of the backup operations are described below. Although a single instance each of the backup server, the production data storage and the backup media are shown in this embodiment, the number of devices may vary in other embodiments.

Figure 2:
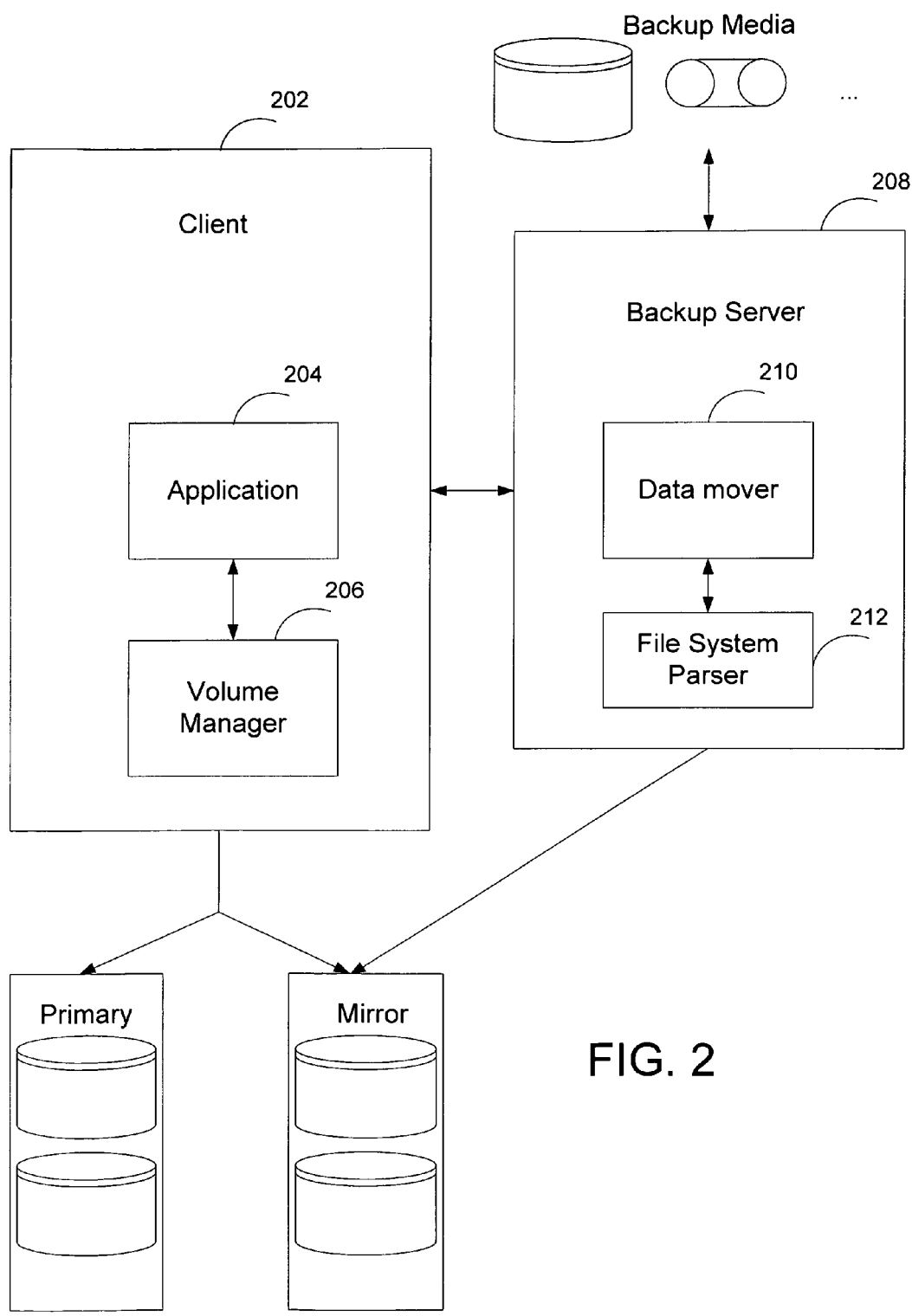
FIG. 2 is a block diagram illustrating an embodiment of a data backup system.

FIG. 2 is a block diagram illustrating an embodiment of a data backup system. In this example, an application 204 and a volume manager 206 are implemented on client 202. The application generates data to be stored. A greater number of applications may be implemented on the client. The volume manager manages the production data storage associated with the client. In some embodiments a client has access to one or more physical storage media (e.g., hard disks, disk arrays, or the like) that are partitioned into sections. The volume manager selectively combines the sections to form one or more virtual organizations of the storage space, referred to as volumes. On each volume resides a file system, which is a hierarchical organization of stored objects (e.g., files, directories, data base objects, etc.) that allows higher level applications to more easily manipulate, navigate, access and retrieve stored data. During backup operations, the volume manager provides backup server 208 with volume information of the objects to be copied. In some embodiments, a backup agent or other process running on client 202 communicates with the backup server and causes the client 202 to perform processing, provide information, etc., required by the backup server to perform a backup of data associated with client 202.

It is quite possible for the data on the production data storage to change before a backup operation completes. For example, after the client has determined the data location and transmitted the information to the backup server, another process may overwrite what is stored in the determined data location. This condition, referred to as a race condition, can lead to data corruption. In the example shown, the race condition is efficiently solved by employing a primary data storage system and a mirrored data storage system in the production data storage associated with the client. During backup, the mirror is split off and temporarily suspended from receiving changes from the client. Data on the mirror is selectively copied to the backup media, and the primary data storage system is still allowed to receive changes in the mean time. The mirror is unsuspended and resynchronized with the primary data storage after the backup operation completes. Although the presence of the mirrored storage provides better efficiency during backup operations, it is not required and at a user's or administrator's option may be omitted in some embodiments.

The backup server includes a data mover component 210 and a file system parser component 212. The components may be implemented as different functions or modules of the same process, or as separate processes. As will be shown in more detail below, using volume information provided by a client, the data mover and file system parser perform discovery to determine locations on the physical storage device of individual stored objects included in the volume.

Figure 3:
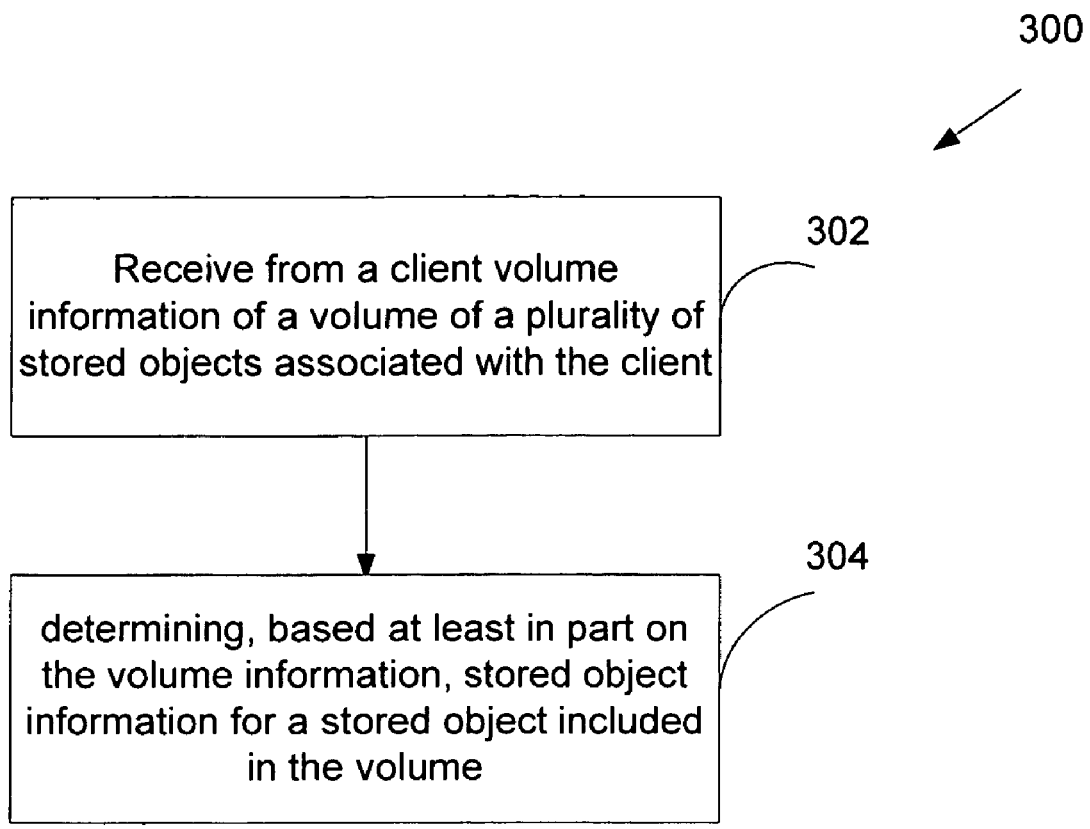
FIG. 3 is a flowchart illustrating an embodiment of a data backup process.

FIG. 3 is a flowchart illustrating an embodiment of a data backup process. In some embodiments, process 300 is implemented on a host other than the client, such as the backup server. In this example, volume information of a volume associated with the client is received at the host (302). The volume information received includes data indicating a physical data storage location of at least a part of the volume. The volume information can be used to map a volume, which is a logical concept, to the volume's underlying physical media. A volume may be spread across more than one contiguous storage areas on the physical storage media and may be spread across two or more physical storage media devices and/or systems. Based on the volume information, stored object information for one or more stored objects is determined (304). The stored object information includes data indicating the physical data storage location(s) of the stored object(s). In some embodiments, the stored object information includes stored object extent information, e.g., a starting location within the volume and/or on physical media and stored object length and/or ending location. The backup server uses the stored object information to copy stored object(s) from the physical data storage(s) location to the backup storage. In some embodiments, the storage device from which the stored objects are copied is blocked from modification while the process is in progress, thus avoiding the race condition without significantly impact on performance. For example, in some embodiments a mirror of production data is split off prior to stored object information being discovered and stored objects being copies to backup media. In some embodiments, the client splits off the mirror prior to determining the volume information and providing the volume information to the backup server or other host configured to discover the stored object information.

In this example, process 300 is implemented on the backup server, although the process may be implemented on any other appropriate host. For example, in some embodiments the process is implemented on a management device. The management determines the stored object information, and either sends the information directly to the backup server, or derive commands based on the object information to the backup server.

Figure 4:
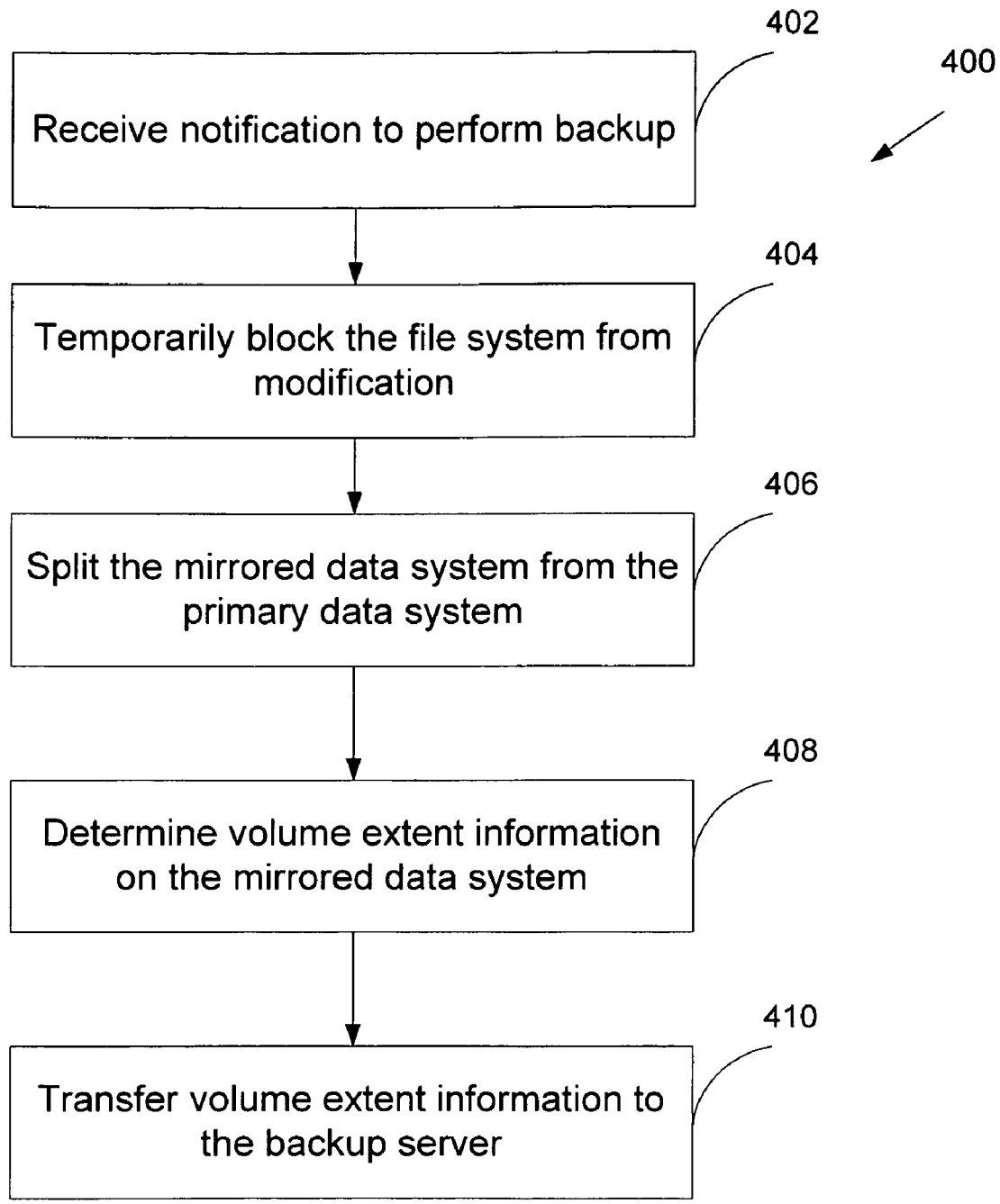
FIG. 4 is a flowchart illustrating an embodiment for determining information to be used in a data backup operation.

FIG. 4 is a flowchart illustrating an embodiment for determining information to be used in a data backup operation. In some embodiments, process 400 is implemented on a client device in enterprise or other network environment. In some embodiments, the process is implemented by the volume manager process. In this example, process 400 initiates when a notification to perform backup is received (402). The file system of the device is temporarily blocked from modification (404). The mirrored data storage is split from the primary data storage (406). In some embodiments, after the mirrored data storage is split, the file system on the primary data storage is no longer blocked from modification and changes are allowed on the primary data storage but suspended on the mirrored data storage. After the completion, the mirrored data storage is resynchronized with the primary data storage and brought up to date.

Figure 6:
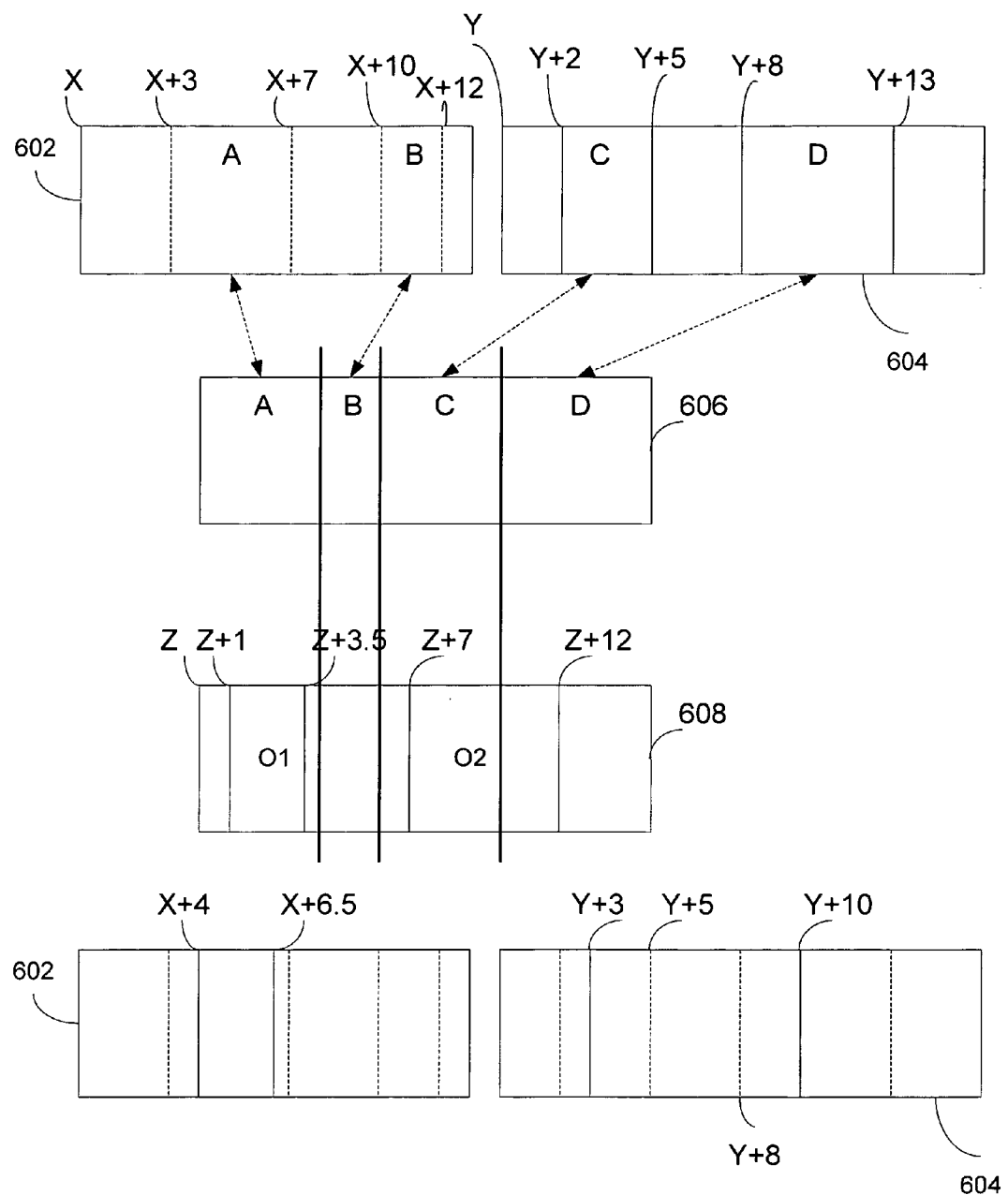
FIG. 6 is a diagram illustrating an example in which the physical locations of two stored objects are determined.

The mirrored data storage is used to derive volume information for subsequent backup operation(s). In this embodiment, the volume information includes volume extent information of the mirrored data storage. The volume extent information is determined (408) and transferred to the backup server (410). In some embodiments, the volume extent information identifies physical locations on the data storage device(s) on which a volume is stored. An example of volume extent information is shown in FIG. 6 below.

A process similar to 400 may be implemented on a client without a mirrored data storage. In some non-mirrored embodiments, the file system on the client device is temporarily blocked from modification until the volume extent information associated with the file system volume is determined.

Figure 5:
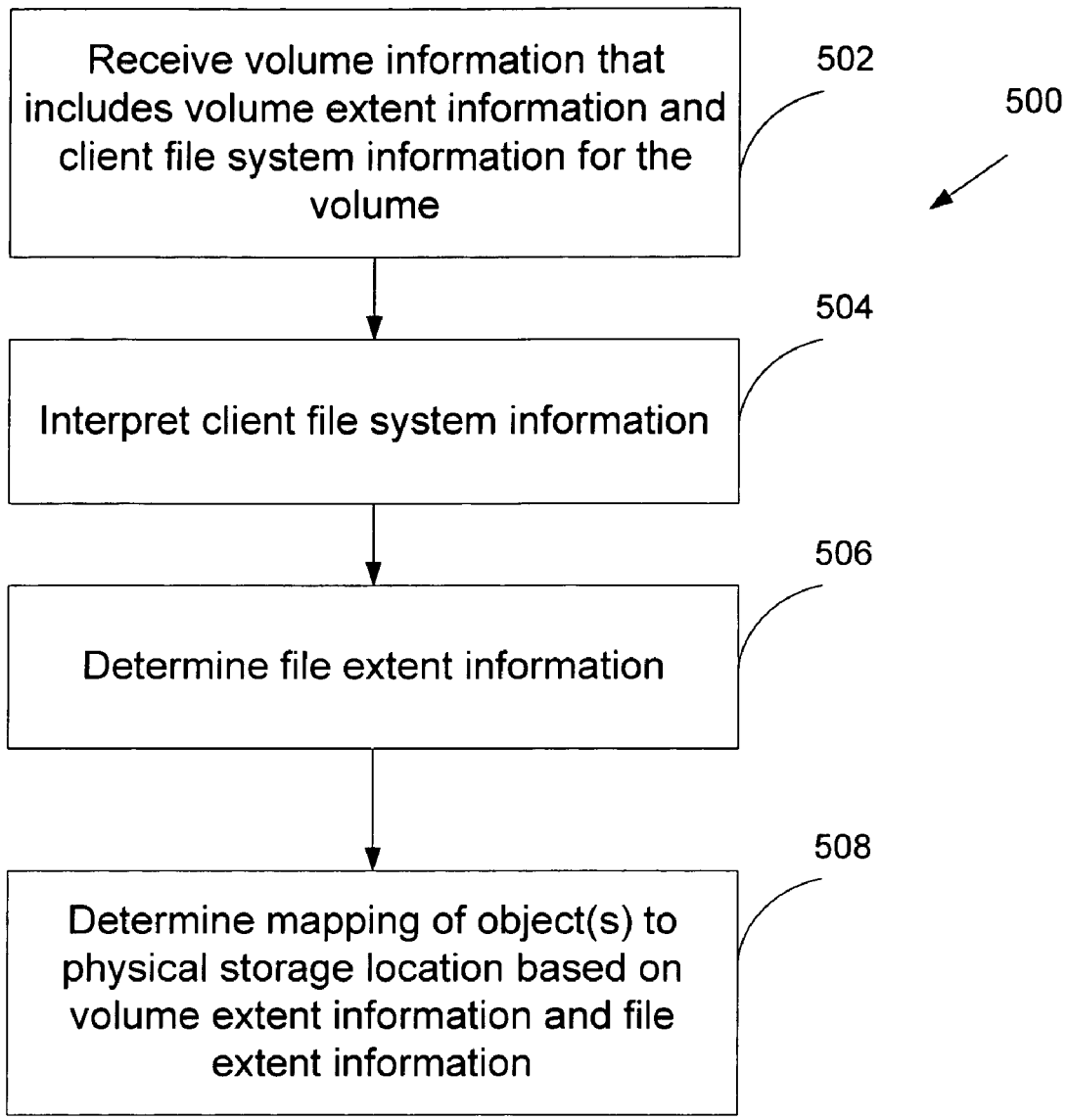
FIG. 5 is a flowchart illustrating an embodiment of a data backup process.

FIG. 5 is a flowchart illustrating an embodiment of a data backup process. In some embodiments, process 500 is implemented by a backup server or another appropriate device separate from the client. In this example, the process begins when volume information that includes volume extent information and associated client file system information is received (502). In some embodiments, the volume extent information received at 502 is generated and provided by a volume manager on a client, e.g., using process 400. In some embodiments, the volume information received at 502 includes information that identifies a file system with which the volume is associated on the client, e.g., HP/HFS, HP/VXFS, HP/JFS, WIN/NTFS, etc. In some embodiments, the volume information received at 502 does not include data identifying the client file system, and the backup server or other host that receives the volume extent information at 502 infers the client file system type at least in part from the identity of the client from which the information received at 502 is received. In some embodiments, only volume extent information is received at 502 and the backup server or other host uses the volume extent information to read client file system information from the volume, e.g., from blocks comprising the volume, which blocks are known based on the client file system type to contain client file system information for the volume.

Using the volume information, a client file system associated with the volume is interpreted (504). In some embodiments, a file system parser is used to interpret the client file system. In some embodiments, the file system of the client is not a file system native to and/or natively recognized by an operating system running on the backup server. For example, in some embodiments, the backup server comprises a Solaris™ server and the client file system comprises a non-Solaris™ file system. The file system parser in some embodiments is created at least in part by reverse engineering and/or receiving an API or other specification of the client file system to understand its structure and encoding, e.g., how superblocks, inodes, etc., are defined, and including in a backup application or other process at the backup server or other host file system parser code configured to enable the backup server or other host to interpret client file system information, even though the client file system is of a type not native to and/or otherwise usable directly by the backup server or other host, e.g., due to differences in operating system between the client and the backup server or other host. The file system parser accesses the mirrored data storage (or, in the case of a non-mirrored system, the primary data storage), reads a specific amount of information from a known location of the volume. The information is analyzed and used to construct on the backup server or other host a view of the client file system for the volume. Different operating systems (such as Microsoft's Windows NTFS, Hewlett-Packard's HFS, Sun Microsystem's Solaris, etc.) may have different rules on from where client file system information for a volume should be read (e.g., which blocks within the volume), how much data should be read, as well as on how the client file system information for a volume should be interpreted. Accordingly, the file system parser carries out the appropriate parsing operations for the specific type of operating system associated with the stored data.

File extent information is determined based on the parsed file system (506). In some embodiments, the file extent information includes information regarding the relative locations of file system objects within the volume. An example of determining file extent information is shown in FIG. 6 below. In some embodiments, the discovery and interpretation of client file system information comprises an iterative process, in which initial information is determined by reading data from one or more blocks associated with volume and interpreting that data in light of the client file system type and using the result to find additional client file system information to read from other blocks associated with the volume, etc. In some embodiments, 504 and 506 are performed in parallel and/or in successive repeated iterations of 504 and 506.

Based on the volume extent information and the file extent information, stored object information, in this case a mapping of one or more objects to their respective physical storage locations, is determined based on the volume extent information and the file extent information (508). In some embodiments, a data mover copies each stored object from its physical storage location to the backup media.

In some embodiments, to determine the stored object information, the file extent information and the volume extent information are translated to physical storage location(s). FIG. 6 is a diagram illustrating an example in which the physical locations of two stored objects are determined. In this example, 602 and 604 are two data storage media that include storage locations and associated data that collectively form a logical volume 606. Sections A and B on 602 and sections C and D on 604 are combined to form volume 606. The physical addresses of storage media 602 and 604 start at X and Y, respectively. The volume extent information indicates the locations on the physical media that correspond to the sections A-D. In the example shown, sections A, B, C, D start at addresses X+3, X+10, Y+2, and Y+8, respectively. Sections A, B, C, D end at addresses X+7, X+12, Y+5, and Y+13, respectively. The offset values are chosen for purposes of illustration and do not necessarily correspond to actual units used for measuring data in a particular system. The volume extent information may be expressed using various formats, such as a set of offset-length pairs (an offset of 3 and a length of 4 for section A, an offset of 10 and a length of 2 for section B, etc.), a set of offset pairs indicating the beginning and the end of the sections (e.g., a beginning offset of 3 and an end offset of 7 for section A), a set of address pairs indicating the beginning and the end of the sections (e.g., X+3 and X+7 for section A), or any other appropriate format or syntax. Since multiple physical media are present in this example, the volume extent information also includes information indicating the specific storage media with which a section is associated.

The volume manager combines the sections to form volume 606. A file system 608 comprises client file system information and associated file system object data stored on the volume. In the example shown, the file system 608 includes two stored objects O1 and O2. O1 starts at an offset of 1 with respect to the starting logical address of the volume, which is designated Z in the example shown. O1 spans a length of 2.5. O2 starts at an offset of 7 and spans a length of 5. The file extent information indicates the relative location of the stored objects in the context of the logical volume 606 and may be expressed as offset-length pairs, offset pairs, address pairs, etc.

Based on the volume extent information and the file extent information, a mapping of a file system object location within a logical volume to the location on which the object is stored on the underlying physical media can be determined. In this example, Z, the beginning of the logical volume and section A, maps to physical location X+3. Thus, the beginning of object O1 at Z+1 maps to physical location X+4, and its end Z+3.5 maps to X+6.5. To copy O1, the data mover starts at an offset of 4 from address X of storage media 602, and copies 2.5 units of data to the backup media.

Object O2 is shown to straddle sections C and D. The beginning of O2 maps to Y+3. O2 spans the rest of section C, which ends at Y+5. The rest of O2 starts at the beginning of section D, which maps to Y+8, and ends at Y+10. To copy O2, the data mover starts at an offset of 3 from the beginning of storage media 604, copies 2 units of data, moves to an offset of 8, and copies 2 more units.

Figure 7:
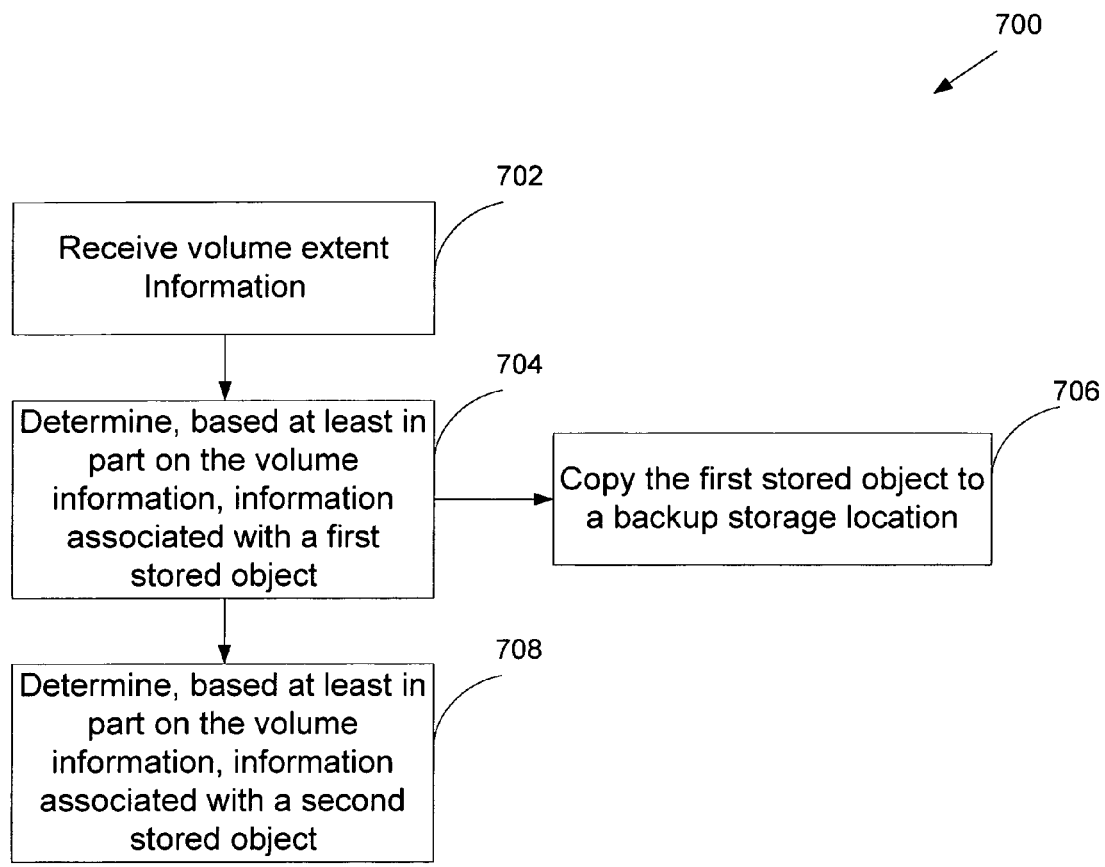
FIG. 7 is a flowchart illustrating an embodiment of a parallel data backup process.

In some embodiments, the backup process is performed sequentially, such that the physical locations of all the stored objects are determined before any object is copied to the backup storage. In some embodiments, some steps in the backup process are performed in parallel, thereby improving the efficiency of the overall operation. FIG. 7 is a flowchart illustrating an embodiment of a parallel data backup process. In this example, process 700 initiates when volume information is received (702). The volume information includes data indicating a physical data storage location of at least a part of the volume. Based at least in part on the volume information, which may include volume extent information or any other appropriate information pertaining to the volume, information for a first stored object is determined (704). A technique similar to what is disclosed in FIG. 6 may be used to make the determination. In the example shown, the first stored object information includes data indicating a physical storage location of the first stored object.

Using the first stored object information, the first stored object is copied from the physical data storage location of the first stored object to a backup storage location (706). This step may take place in a thread or process concurrent to the thread or process that determined the first stored object information. Meanwhile, information associated with a second stored object is determined based at least in part on the volume information (708). In the example shown, step 706 starts before step 708 completes. Therefore, if the determination of the information associated with the second stored object takes some time to complete, the data mover is not blocked from copying the first object as it would in a non-parallel backup process. As used herein, the designation of the first and the second stored objects is for purposes of distinguishing the objects, rather than implying that one object necessarily comes immediately before the other. One or more intervening objects may exist between the first and the second objects and may be processed as well.

Figure 8:
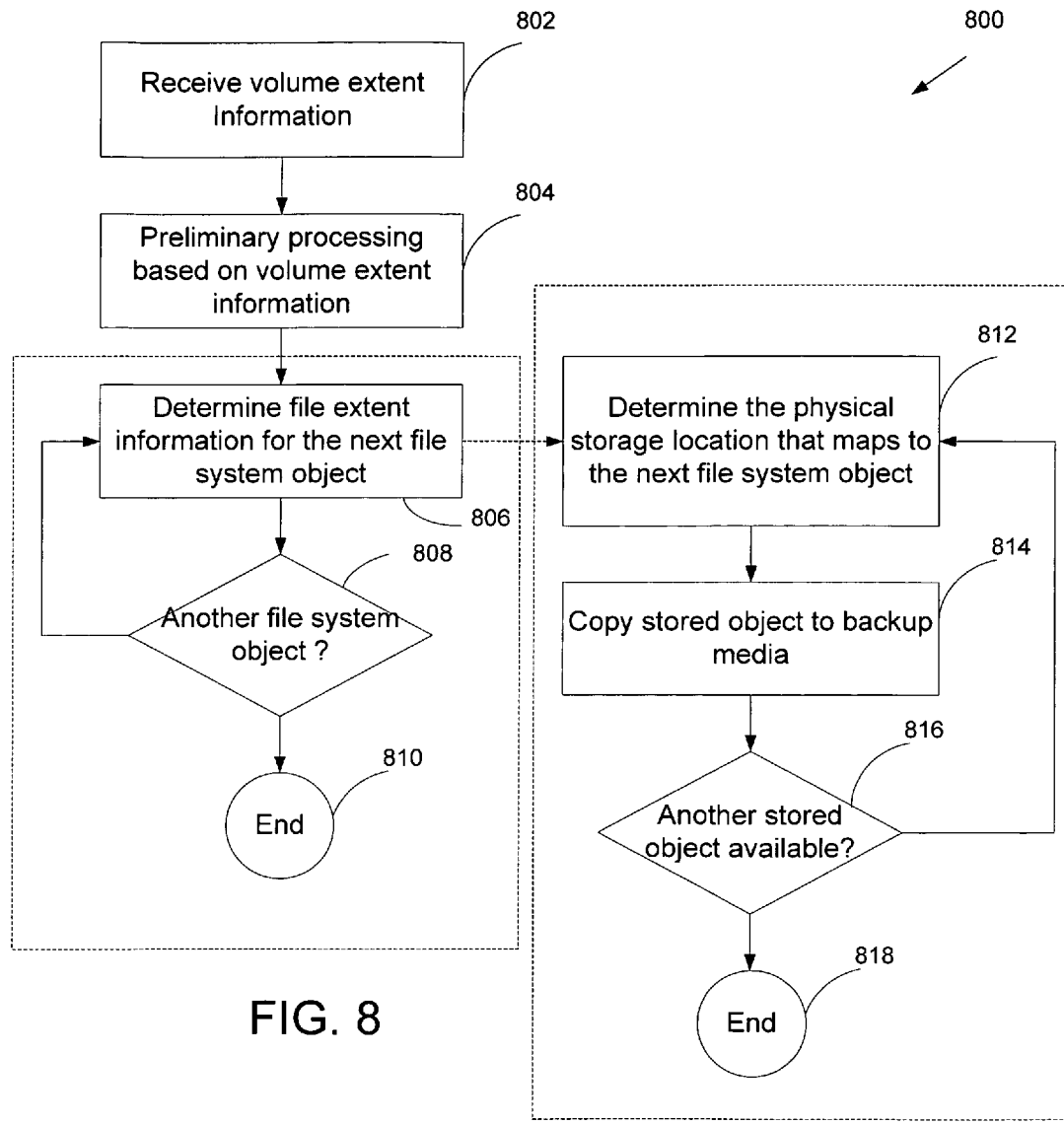
FIG. 8 is a diagram illustrating another embodiment of a concurrent data backup process.

FIG. 8 is a diagram illustrating another embodiment of a concurrent data backup process. In this example, process 800 initiates when the volume extent information is received (802). The volume extent information is optionally preliminarily processed to determine, for example, the location on the production storage device where further information about the file system may be found (804). The file extent information for a file system object on the volume is determined (806). It is determined whether there is another file system object that should be processed (808). If another file system object is available for processing, its file extent information is determined (806). Steps 806-808 repeat, until the file extent information for all the file system objects requiring backup is determined (810). In the example shown, steps 806-810 are carried out in the same thread.

Meanwhile, in a separate thread, the physical storage location that maps to a file system object is determined (812). The determination is based at least in part on the file system object's file extent information. Accordingly, the stored object is copied from its storage location (814). It is determined if there is another stored object available for copying (816). If so, steps 812 and 814 are repeated, until there is no more stored object to be copied (818).

Although two separate threads are used in this example, the number may vary in some embodiments. In some embodiments, additional threads may be used to perform various tasks. For example, separate threads may be used to carry out steps 812 and 814. In some embodiments, the steps may be carried out in different order. For example, file extent information and/or physical storage locations for several file objects may be determined in a batch, and the corresponding stored objects are then copied. Further, processes or other appropriate structures for concurrent execution may be used in place of threads.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of performing data backup for a client, comprising:
   receiving, at a host other than the client, volume information including data indicating a physical data storage location of at least a part of a volume comprising one or more stored objects associated with the client;
   determining, at the host and based at least in part on the volume information received, a file system type of a client file system associated with the volume, the file system type being a non-native file system type which is not natively recognized by an operating system running on the host;
   using a file system parser on the host to parse the client file system associated with the volume to obtain file extent information, wherein:
      the file system parser includes a non-native file system parser configured to parse the non-native file system type which is not natively recognized by the operating system running on the host; and
      the file system parser is configured to parse the client file system associated with the volume to obtain file extent information including by:
         determining a location associated with the client to access based at least in part on (1) the determined file system type of the client file system and (2) the file system parser's knowledge of where the non-native file system type stores file system information for a volume; and
         accessing the determined location associated with the client to obtain file system information;
   determining at the host, based at least in part on the file extent information, stored object information for the stored object included in the volume, the stored object information including data associated with a physical data storage location of the stored object;
   and copying the stored object from the physical data storage location of the stored object to a backup storage in parallel with continued processing of volume information to determine stored object information for another stored object in the volume; wherein
   the stored object does not necessarily correspond to a contiguous range of physical storage space.

2. A method as recited in claim 1, wherein the volume information includes volume extent information.

3. A method as recited in claim 2, wherein determining the stored object information includes determining file extent information based on the volume extent information.

4. A method as recited in claim 1, wherein determining the stored object information includes determining a logical location of the stored object within the volume, and mapping the logical location to the physical data storage location.

5. A method as recited in claim 1, wherein the data is stored on both a primary data storage and a mirror data storage associated with the client and the method further comprises suspending changes to the mirrored data storage prior to determining the stored object information.

6. A method as recited in claim 1, wherein the data is stored on both a primary data storage and a mirror data storage associated with the client and the physical data storage location of the stored object is determined with respect to the mirrored data storage.

7. A method as recited in claim 6, further comprising copying the stored object from the mirrored data storage to a backup storage.

8. A data backup system configured to perform data backup for a client, comprising:
an interface configured to receive volume information including data indicating a physical data storage location of at least a part of a volume comprising one or more stored objects associated with the client; and
a processor coupled to the interface, configured to:
determine, at the host and based at least in part on the volume information received, a file system type of a client file system associated with the volume, the file system type being a non-native file system type which is not natively recognized by an operating system running on the host;
use a file system parser on the host to parse the client file system associated with the volume to obtain file extent information, wherein:
the file system parser includes a non-native file system parser configured to parse the non-native file system type which is not natively recognized by the operating system running on the host; and
the file system parser is configured to parse the client file system associated with the volume to obtain file extent information including by:
determining a location associated with the client to access based at least in part on (1) the determined file system type of the client file system and (2) the file system parser's knowledge of where the non-native file system type stores file system information for a volume; and
accessing the determined location associated with the client to obtain file system information;
determine, based at least in part on the file extent information, stored object information for a stored object included in the volume, the stored object information including data associated with a physical data storage location of the stored object;
copy the stored object from the physical data storage location of the stored object to a backup storage in parallel with continued processing of volume information to determine stored object information for another stored object in the volume; wherein
the stored object does not necessarily correspond to a contiguous range of physical storage space.

9. A data backup system as recited in claim 8, wherein the data backup system is separate from the client.

10. A data backup system as recited in claim 9, wherein the data backup system has a different operating system than the client.

11. A data backup system as recited in claim 9, wherein the data backup system has an operating system that does not natively recognize a file system associated with the client.

12. A data backup system as recited in claim 9, wherein to determine the stored object information to determine file extent information based on the volume extent information.

13. A computer program product for performing data backup for a client, the computer program product being embodied in a computer readable storage medium and comprising computer instructions for:
receiving, at a host other than the client, volume information including data indicating a physical data storage location of at least a part of a volume comprising one or more stored objects associated with the client; and
determining, at the host and based at least in part on the volume information received, a file system type of a client file system associated with the volume, the file system type being a non-native file system type which is not natively recognized by an operating system running on the host;
using a file system parser on the host to parse the client file system associated with the volume to obtain file extent information, wherein:
the file system parser includes a non-native file system parser configured to parse the non-native file system type which is not natively recognized by the operating system running on the host; and
the file system parser is configured to parse the client file system associated with the volume to obtain file extent information including by:
determining a location associated with the client to access based at least in part on (1) the determined file system type of the client file system and (2) the file system parser's knowledge of where the non-native file system type stores file system information for a volume; and
accessing the determined location associated with the client to obtain file system information;
determining at the host, based at least in part on the file extent information, stored object information for a stored object included in the volume, the stored object information including data associated with a physical data storage location of the stored object;
and copying the stored object from the physical data storage location of the stored object to a backup storage in parallel with continued processing of volume information to determine stored object information for another stored object in the volume; wherein
the stored object does not necessarily correspond to a contiguous range of physical storage space.

14. A computer program product as recited in claim 13, wherein the volume information includes volume extent information.

15. A computer program product as recited in claim 13, wherein determining the stored object information includes determining file extent information based on the volume extent information.

16. A method as recited in claim 1, wherein using the file system parser on the host to parse the client file system associated with the volume to obtain file extent information includes an iterative discovery process, including:
processing a first set of one or more blocks to obtain a first set of client file system information; and
interpreting the first set of client file system information in light of the determined client file system type to locate a second set of client file system information to obtain from a second set one or more other blocks different from the first set of blocks.

17. A data backup system as recited in claim 8, wherein the processor is configured to use the file system parser on the host to parse the client file system associated with the volume to obtain file extent information by using an iterative discovery process, including:
    processing a first set of one or more blocks to obtain a first set of client file system information; and
    interpreting the first set of client file system information in light of the determined client file system type to locate a second set of client file system information to obtain from a second set one or more other blocks different from the first set of blocks.

18. A computer program product as recited in claim 13, wherein the computer instructions for using the file system parser on the host to parse the client file system associated with the volume to obtain file extent information includes computer instructions for an iterative discovery process, including:
    processing a first set of one or more blocks to obtain a first set of client file system information; and
    interpreting the first set of client file system information in light of the determined client file system type to locate a second set of client file system information to obtain from a second set one or more other blocks different from the first set of blocks.

* * * * *